April 26, 1966 G. N. HOWATT 3,247,711
DIGITAL FORCE MEASURING APPARATUS
Filed June 10, 1963 2 Sheets-Sheet 1
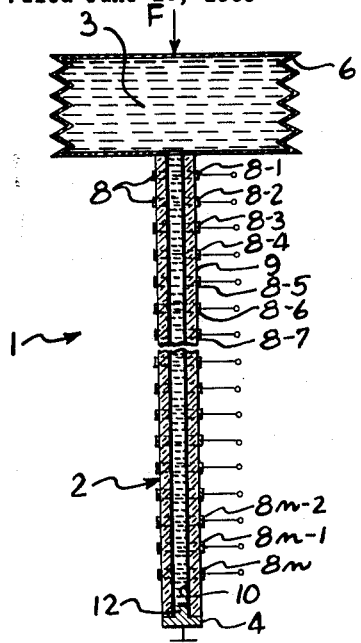
Fig.1
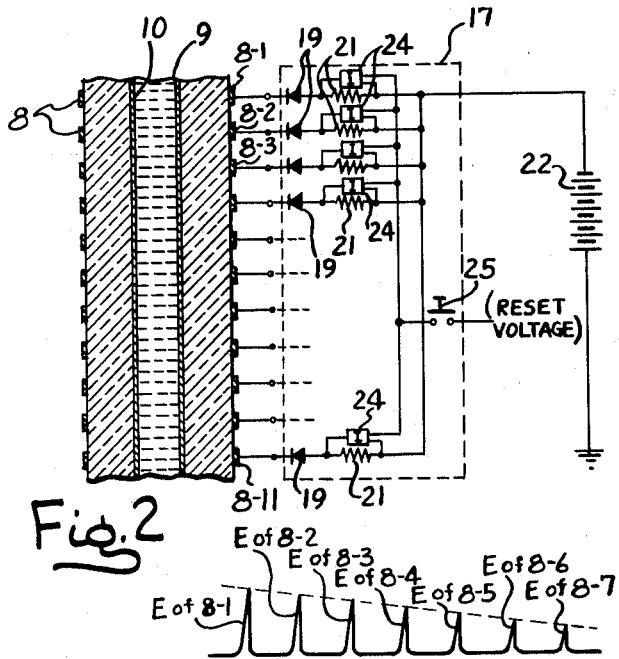
Fig.2
Fig.3
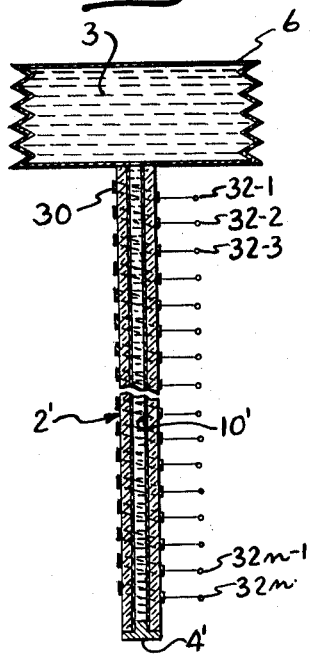
Fig.4
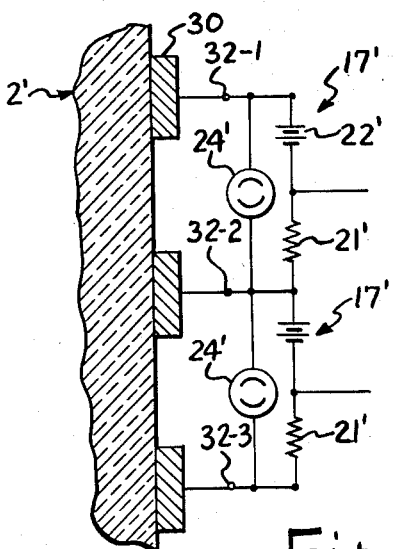
Fig.5
INVENTOR.
GLENN N. HOWATT
BY
Wallenstein, Spangenberg
& Hattis
ATTYS.

April 26, 1966 G. N. HOWATT 3,247,711
DIGITAL FORCE MEASURING APPARATUS
Filed June 10, 1963 2 Sheets-Sheet 2

INVENTOR.
GLENN N. HOWATT
BY
ATTYS.

United States Patent Office 3,247,711
Patented Apr. 26, 1966

3,247,711
DIGITAL FORCE MEASURING APPARATUS
Glenn N. Howatt, Metuchen, N.J., assignor to Gulton Industries, Inc., Metuchen, N.J., a corporation of New Jersey
Filed June 10, 1963, Ser. No. 286,689
9 Claims. (Cl. 73—141)

The present invention relates to force measuring apparatus which has its most important application in accelerometers, pressure gauges and the like. More particularly, the present invention provides a force measuring apparatus for the purposes just described which converts the particular force variable involved directly to an electrical digital signal. The expression "digital signal" is intended to mean a signal where, unlike an analog signal where the amplitude of the signal conveys the information on the value of the variable, the number or spacing of a number of component signal elements making up the digital signal involved conveys the information. In a specific example of the invention to be described, the digital signal is indicated by the number of signal elements involved.

To provide a digital signal indicative of the value of the force being measured it has been common to provide a force responsive member of some kind which is responsive directly to the pressure or other force variable involved, and a mechanical linkage which connects the force responsive member to a potentiometer or some other electrical device which provides an analog electrical signal representing the force variable. A conventional electrical analog to digital converter device is provided which converts the electrical analog signal to an electrical digital signal. These prior techniques for converting a force variable to an electrical digital signal with any degree of accuracy left much to be desired from a standpoint of the simplicity and reliability of the equipment, the compactness thereof and other factors. It is, accordingly, one of the main objects of the present invention to provide force measuring apparatus useful for example as an accelerometer, pressure gauge or the like, which converts the force variable to an electrical digital signal in a very simple and direct manner.

In accordance with the invention, the force measuring apparatus includes a force responsive member which converts a mechanical force directly to a pattern of analog signals which indicates the value of the variable. The pattern of analog signals involved is most advantageously a number of analog signals which vary progressively in amplitude, the amplitude of any one signal being a measure of the force involved. In one form of the invention, where dynamic forces are being measured, the force responsive member is a capillary tube filled with a liquid and the force is applied as a pressure wave sent down the tube. The pressure wave is applied, for example, by bellows connected to one end of the tube, the bellows being momentarily compressed by the force to be measured. The surface tension and viscous drag on the fluid within the capillary tube will cause the magnitude of the pressure wave to vary progressively along the length of the tube according to the attenuation thereof produced within the tube. Thus, the segment of the tube near the end initially receiving the pressure wave will have a greater stress set up therein by the wave than a segment of the tube further down the tube. The mechanical stresses set up in the tube are directly converted to an electrical variable by making the tube out of a piezoelectrical material or providing a helical winding of strain gauge resistance wire around the tube.

Another form of the invention useful with both static and dynamic forces utilizes a cantilevered beam made of a piezoelectrical material or a centrally or peripherally anchored disc made of a piezoelectrical material. In these forms of the invention, the force responsive member is flexed by the force to be measured, the degree of flexure of various segments thereof varying with the spacing of the segment involved from the anchored end thereof and the magnitude of the flexing force.

Force responsive members made of materials having piezoelectric properties (i.e. produces a voltage when placed under a dynamic stress) is preferred for both the flexure member and capillary tube embodiments of the invention. Materials having other piezoelectrical properties, such as piezo-resistive and piezo-capacitive properties, are also useful in the practice of the invention. Where ferro-electric ceramic materials having these properties are used, spaced insulated conductive electrodes are applied to the various segments of the force responsive member in which progressively varying stresses are set up, so that the particular electrical characteristic being measured, such as voltage, capacity or resistance, can be readily coupled to external detecting circuits.

A detector circuit responsive to the particular electrical characteristic being measured is connected to each segment of the force responsive member to be monitored, and the various detector circuits have level responsive means which operate to signal the presence of an electrical analog characteristic having a magnitude in excess of a predetermined level. This level is set, for example, so that for relatively small forces to be measured, only those segments receiving the greatest stresses will produce an electrical analog signal reaching the level involved, and for relatively large forces a proportionately larger number of segments will produce an electrical analog signal reaching this level. If the detector circuits produce a signal when the level is referred to is reached, and no signal when the level referred to is not reached, the signal condition of all the detector circuits considered collectively will be a digital signal comprising a number of signal elements which is a function of the force being measured.

The above and other objects, advantages and features of the invention will become apparent upon making reference to the specification to follow, the claims and the drawings wherein:

FIG. 1 is a longitudinal sectional view through a force measuring device constructed in accordance with the present invention which utilizes a capillary tube made of piezoelectric material;

FIG. 2 is an enlarged fragmentary sectional view of the bottom portion of the apparatus shown in FIG. 1 with electrical detector circuits connected to electrodes thereof for sensing the presence of a predetermined voltage level developed at the electrodes of the capillary tube;

FIG. 3 shows the progressively varying amplitude of the voltages developed in the various segments of the capillary tube for a given applied force;

FIG. 4 is a longitudinal sectional view of a modified form of force measuring apparatus where the capillary tube is made of an insulating material which has no piezoelectric properties and is surrounded by a winding of piezo-resistive material, such as strain gauge wire, for accomplishing objectives similar to that of the embodiment of the invention shown in FIGS. 1 and 2;

FIG. 5 is an enlarged fragmentary sectional view of a portion of the capillary tube shown in FIG. 4 with electrical detector circuits connected to tap-off points on the winding therearound for sensing the presence of a predetermined resistance level thereat;

Figure 6:
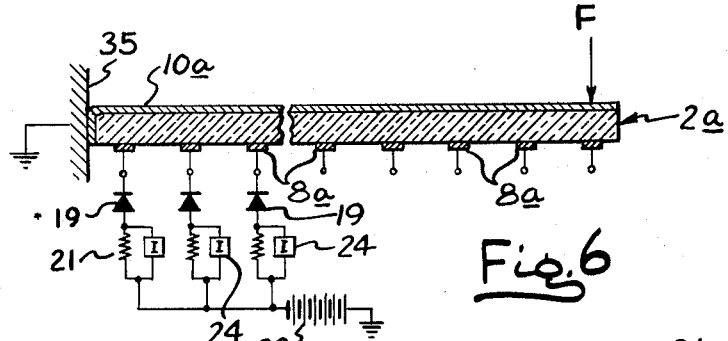
FIG. 6 is a longitudinal sectional view of another form of the invention wherein a cantilevered beam made of a piezoelectric material is used as the force responsive member.

Referring now to FIGS. 1 and 2, the force measuring apparatus 1 there shown includes a fluid filled capilliary tube 2 made of a piezoelectric material, such as a polarized ferroelectric ceramic material like barium titanate, which generates an electrical voltage when dynamic stresses are set up therein. The fluid is identified by reference numeral 3 and is preferably a viscous material such as oil. One end of the capillary tube 2 is sealed off by a metal plug 4 and the other end is open to a source of the fluid 3 to which a dynamic pressure is to be applied. This pressure may be the force or pressure which is the variable directly to be measured or can be a pressure set up by an external force F applied to an enclosed bellows 6 filled with the fluid 3. When the bellows is compressed by the force F, a pressure wave is sent down the capillary tube 2. Because of surface tension and viscous drag, the stresses set up in the walls of the capillary tube will progressively diminish away from the end of the tube which initially receives the pressure wave. After a short period, when equilibrium has been reached, the pressure wave will disappear completely.

The capillary tube is divided into axially spaced segments by a series of spaced ring electrodes 8 (individually identified 8–1, 8–2 . . . 8–n) of conductive material coated, sprayed or otherwise applied around the outside of the capillary tube 2. The entire inside surface of the capillary tube 2 is coated with a continuous film or layer of a conductive material which constitutes an internal common electrode 10. This common electrode 10 may be grounded through the plug 4 which has a stem 12 projecting into the capillary tube to make electrical contact with the common electrode 10 therein. Stresses built up in a given segment of the capillary tube develops a voltage proportional to this stress between the ring electrode 8 involved and the common electrode 10. This voltage will depend upon the spacing of the particular electrode from the end of the capillary tube 2 from which the pressure wave originates and the magnitude of the force F applied to the bellows 6. The output at each ring electrode 8 is a voltage pulse E like that shown in FIG. 3.

In effect, the capillary tube 2 with its electrodes 8 and 10 serves both as a force responsive member which is stressed in proportion to the force being measured and a device which provides a pattern or distribution of electrical analog signals which collectively represent the value of the force variable being measured. These signals are converted to an electrical digital signal by means of a series of detector circuits collectively identified by reference numeral 17 which are respectively connected to the ring electrodes 8.

Each of the detector circuits illustrated in FIG. 2 comprises a rectifier 19 in series with a resistor 21 and a common source of direct current (D.C.) reference voltage 22. The rectifier 19 and the source of D.C. voltage are connected so that the polarity of the voltage developed between the associated ring electrode 8 and the common electrode 10 by the stresses built up in the tube is in a direction which effects current flow through the rectifier 19 in its low impedance direction and the voltage of the source of D.C. reference voltage 22 opposes current flow therethrough in this direction. The magnitude of the reference voltage is selected so that it is equal to or slightly less than the magnitude of the voltage which will be generated between the first ring electrode 8–1 and common electrode 10 by the lowest level of force to be measured by the force measuring apparatus. When the force is at this level, it is apparent that only the diode 19 associated with the first ring electrode 8–1 will become conductive because the stresses at and therefore the voltage developed at the other ring electrodes 8–2, 8–3 . . . 8–n are insufficient to cause conduction of the associated diode 19. Thus, only the resistor 21 associated with the first ring electrode 8–1 will have a significant voltage thereacross when the lowest level of force is applied to the force measuring apparatus.

A suitable indicating device 24 is connected across the resistor 21 to sense the presence of this voltage. The indicator 24 could include a bistable circuit with a light controlled thereby which bistable circuit is set into one state by the voltage across resistor 21, which energizes the light until the bistable circuit is reset by depression of a reset switch 25.

When the highest level of force to be measured is applied, the pressure wave force sent down the tube 2 is so high that the magnitude of the attenuated pressure reaching the last electrode 8–n of the tube 2 will be sufficient to generate a voltage across the electrode 8–n and the common electrode 10 which will just cause the associated rectifier 19 to conduct. It is apparent that a relatively small number of the detector circuits will be rendered conductive to operate the associated indicator 24 when the force F applied to the bellows 6 is at a low level and a relatively large number of the detector circuits will be rendered conductive when the force F is at a relatively high level. This in effect gives a digital output which comprises a number of signal units proportional to the variable being measured.

Refer now to the embodiment of the invention shown in FIGS. 4 and 6 which is similar to the embodiment shown in FIGS. 1 and 2 in that it utilizes a capillary tube 2'. Corresponding portions of these devices are similarly numbered except that a prime (') has been added to the reference numerals in FIGS. 4 and 5. However, the capillary tube 2' illustrated is made of an insulating material which does not have any piezoelectric properties, such as glass or other similar insulating material. This capillary tube 2' is surrounded by a helical winding of strain gauge resistance wire 30. A series of output terminals 32–1, 32–2 . . . 32–n are connected to equally spaced tap-off points along the helical winding 30. It is apparent from an explanation of the form of the invention shown in FIGS. 1 and 2 that, when the pressure wave is sent down the capillary tube 2, the stress set up in the various segments of the helical wire 30 will decrease progressively toward the plugged end of the capillary tube 2'.

Individual detecting circuits 17' shown in FIG. 5 are connected between the successive pairs of terminals 32–1, 32–2, etc. each to detect the presence of a resistance between successive tap-off points on the helical winding which exceeds a predetermined set level. As in the case of the detector circuits 17 previously described, the detector circuits 17' may take a variety of forms. In the illustrated embodiment of the invention of FIG. 5, each detector circuit 17' is identical and comprises a source of D.C. reference voltage 22' and a resistor 21' connected across the associated pair of terminals 32. A neon tube 24' is connected in parallel with the series connected D.C. reference voltage source 22' and the resistor 21'. Each neon tube 24' is thus coupled in parallel with the resistance of the segment of the helical winding 30 being monitored. When a pressure wave is sent down the capillary tube 2' by the compression of the bellows 6, the tube expanding stresses set up in the walls of the capillary tube 2' will accordingly momentarily increase but in a progressively decreasing manner down the tube. The resistance of each winding segment increases, a larger proportion to the magnitude of the tube expanding stress set up in the segment involved. It is apparent that as the resistance of each winding segment increases, a larger proportion of the voltage of the associated D.C. reference voltage source 22' will appear thereacross. Each neon tube 24' has a certain threshold of voltage which is required to fire the same (which is the same for all of the neon tubes). The D.C. reference voltage source and resistor 21 are of such a value that the firing voltage of the associated neon tube 24' is developed across the winding segment involved when the stress in the associated part of the capillary tube is equal to the stress set up in the first tube segment receiving the pressure wave when the lowest level of force to be measured is applied to the bellows 6. Since the succeeding segments of the tube (and the helical winding 30) will be stressed to a lesser degree than the first segment thereof, the voltage developed thereacross will be proportionately lower and so the neon tubes 24' of the successive detector circuits 17' will not fire for the lowest level of force applied thereto. On the other hand, as this force is increased from this lowest level, a proportionately greater number of the neon tubes of the detector circuits will be energized.

The advantage of the form of the invention shown in FIG. 3 using the strain gauge resistance wire is that it can be used with static as well as dynamic forces, since the resistance of the wire 30 is a direct measure of the instantaneous force applied thereto and does not need a change of force to produce an output as in the case of piezoelectric materials. However, it should be noted that the capillary tube 2 of FIG. 1 may be made of a piezo-capacitive or piezo-resistive ferroelectric material in which case the detector circuits used therewith which are responsive to resistance or capacity variables will respond both to static or dynamic forces.

Refer now to the embodiment of the invention shown in FIG. 6 in which the present invention is applied to a cantilevered beam 2a acting as the force responsive member. The cantilevered beam may be more of a piezoelectrical material, which may be polarized barium titanate or the like, which produces a voltage in proportion to the stresses developed therein. One end of the beam 2a is anchored in any suitable way so that a free end is provided for receiving the force F to be measured. The beam 2a is divided into longitudinally spaced segments by spaced insulated electrodes 8a spaced along the length of one side of the beam. The other side of the beam 2a is provided with a common electrode 10a which extends the full length of the beam. The common electrode 10a may be grounded by carrying the electrode around the inner edge of the beam 2a and anchoring this end of the beam to a stationary conductive wall 35, which in turn is grounded.

Each of the individual conductive electrodes 8a is shown connected to an individual detecting circuit 17 like that shown in FIG. 2 and thus comprises a rectifier 19, a resistor 21 with an indicator 24 coupled thereacross, and a source 22 of D.C. reference voltage. The source of D.C. reference voltage 22 back biases the individual rectifiers 19 against conduction until the dynamic stress in the segment of the beam 2a involved is of such a level that the voltage pulse generated in the beam across the associated electrode 8a and the common electrode 10a will overcome the back biasing effect of the voltage source 22. When a given force F is applied to the end of the beam 2a, it will flex the beam to provide progressively decreasing stresses in the beam proceeding outwardly from the anchored inner end thereof to energize or operate a number of indicators 24 proportional to the magnitude of the force in the same manner as explained in connection with the embodiment of the invention shown in FIGS. 1 and 2.

Figure 7:
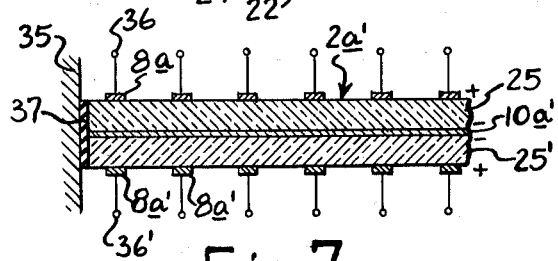
FIG. 7 is a longitudinal sectional view of a modified form of the cantilevered beam embodiment of the invention shown in FIG. 6.
Figure 8:
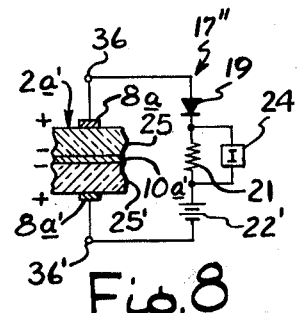
FIG. 8 illustrates an exemplary detector circuit used with the embodiment of FIG. 7.

Refer now to the embodiment of the invention shown in FIG. 7 which is similar to that shown in FIG. 6 except that the cantilevered beam 2a' is a composite structure comprising two superimposed bars 25 and 25' of piezoelectric material having a common inner electrode 10a' which physically and electrically interconnects the confronting surfaces of the bars. Corresponding longitudinally spaced electrodes 8a–8a' are applied to the outer surfaces of the bars. Connecting terminals 36–36' are wired to these electrodes. The central electrode 10a' is insulated from the conductive wall 35 to which the bars are anchored by a suitable layer 37 of insulation material. The bars 25–25' of pieboelectric material are polarized so that their developed voltages are in additive relation through the beam. Since the flexure of the beam 2a' will place one of the bars 25 or 25' in compression and the other in tension, the outer surfaces of the piezoelectric bars 25–25' of piezoelectric material are polarized so same polarization relative to the inner surfaces thereof next to the common electrode 10a', is that the flexure of the beam 2a' will produce additive voltage across the electrodes 8a–8a' of the bars 25–25'.

Detector circuits 17" operating in the same manner as the detecting circuits shown in FIG. 2 are connected with the corresponding electrode pairs 8a–8a' through their connecting terminals 36–36'. Thus, each circuit has a rectifier 19, a resistor 21 shunted by an indicator 24 and a source of back biasing D.C. reference voltage 22' connected in series across a corresponding pair of terminals 36–36'. In this form of the invention, no common D.C. reference voltage source 22' is utilized because of the absence of a common grounded electrode connection.

Figure 9:
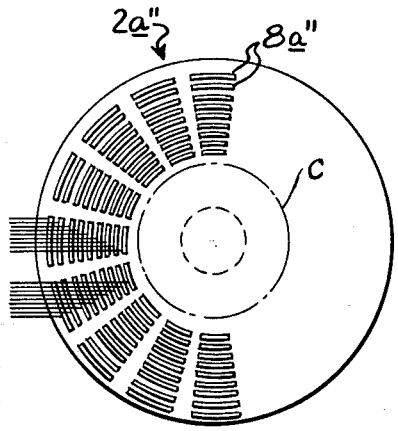
FIG. 9 is a plan view of still another form of the present invention where the force responsive member is a circular piezoelectric disc.
Figure 10:
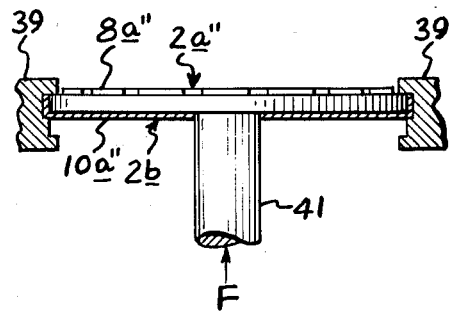
FIG. 10 is a side elevational view, partly in section, of the embodiment of the invention shown in FIG. 9 anchored in a clamp.

Refer now to the embodiment of the invention illustrated in FIGS. 9 and 10. As there shown, the force receiving member is in the form of a circular disc 2a" made of a material of piezoelectrical properties, such as a polarized ferroelectric material like barium titanate or the like. This disc has a continuous layer 10a" of conductive material on one side thereof which extends around the peripheral edges of the disc. The perimeter of the disc 2a" is shown anchored in a metal clamping block 39 which is grounded so as to ground the electrode 10a" at the perimeter of the disc 2a".

The other side of the disc 2a" has spaced electrodes 8a" thereon. These electrodes are located along a spiraling path and form segments along this path. With this arrangement of the electrodes 8a" it is possible to provide an exceedingly large number of electrodes spaced in small progressively increasing incremental amounts from the periphery of the disc 2a". These segments are thus subjected to progressively increasing stresses as the segments involved get closer to the anchored portion of the disc. The innermost segment is positioned adjacent to a dashed circle C in FIG. 9 which represents a line of zero stress in the disc 2a" so that the voltage outputs of the segments progressively increase with the spacing of the segments from the circle C. The force to be measured is here applied to the central portion of the disc through a force coupling extension 41. The voltages developed at the various segments of the disc are measured between each of the electrodes 8a" and the common electrode 10a". Suitable detector circuits (not shown) like that described are connected across these electrodes.

It should be understood that numerous modifications may be made in the most preferred forms of the invention described above without deviating from the broader aspects of the invention.

What I claim as new and desire to protect by Letters Patent of the United States is:

1. Force measuring apparatus comprising: force responsive means to be subjected to a force to be measured and having contiguous segments which are subjected to a progressively varying stress when a force to be measured is applied thereto, the magnitude of the stress applied to each segment being a function of the magnitude of the force applied to the force responsive means and the position of the segment therein, said force responsive means having a variable electrical characteristic which provides an electrical analog output at each segment which is a measure of the stress applied thereto, and individual detector circuits responsive to said electrical output of said segments connected to said segments, each of said detector circuits including means for signaling the presence of an electrical output at the associated segment having a magnitude in excess of a predetermined value.

2. Force measuring apparatus comprising: force responsive means to be subjected to a force to be measured and having contiguous segments which are subjected to a progressively varying stress when a force to be measured is applied thereto, the magnitude of the stress applied to each segment being a function of the magnitude of the force applied to the force responsive means and the position of the segment therein, said force responsive means having a variable electrical characteristic which provides an electrical analog output at each segment which is a measure of the stress applied thereto, spaced conductive electrodes respectively applied to said force responsive means at the locations of said segments, and individual detector circuits responsive to said electrical output of said segments connected to said electrodes, each of said detector circuits including means for signaling the presence of an electrical output at the associated segment having a magnitude in excess of a predetermined value, wherein the number of detector circuits signaling the presence of an electrical characteristic having said predetermined magnitude is a measure of the value of the force being measured.

3. The force measuring apparatus of claim 2 wherein said force responsive means is a cantilevered beam with said segments and the electrodes applied thereto being spaced longitudinally of the beam.

4. The force measuring apparatus of claim 2 wherein said force responsive means is in the form of a flexible disc, said spaced segments and the electrodes thereat being located along a spiral path where the segments and electrodes are spaced progressively increasing distances from the center of the disc.

5. The force measuring apparatus of claim 1 wherein said force responsive means is a piezoelectric member wherein a voltage is developed at each of said segments proportional to the stresses set up therein, and each of said detector circuits including a rectifier and a source of D.C. biasing voltage connected to said segments to provide an abrupt change of current through said rectifier when the voltage generated in the associated segment exceeds the value of said source of D.C. biasing voltage, and signaling means associated with each detector circuit responsive to the change of conduction of the associated rectifier.

6. Force measuring apparatus comprising: a fluid filled capillary tube having piezo-responsive axially spaced means thereon which provide electrical analog outputs which are a measure of the stresses respectively applied thereto, force receiving means for applying a pressure wave whose magnitude is proportional to the force to be measured to one end of said capillary tube wherein a pressure wave proceeds down toward the other end of the tube, surface tension and frictional drag providing a progressively decreasing pressure down the tube, individual detector circuits responsive to said electrical outputs respectively connected to said axially spaced means, each of said detector circuits including means for signaling the presence of an electrical output at the associated segment having a magnitude in excess of a predetermined value.

7. Force measuring apparatus comprising: a fluid filled capillary tube having piezo-responsive axially spaced means thereon which provide electrical analog outputs which are a measure of the stresses respectively applied thereto, force measuring means for applying a pressure wave whose magnitude is proportional to the force to be measured to one end of said capillary tube wherein a pressure wave proceeds down toward the other end of the tube, surface tension and frictional drag providing a progressively decreasing pressure down the tube, individual detector circuits responsive to said electrical outputs respectively connected to said axially spaced means, each of said detector circuits including means for signaling the presence of an electrical output at the associated segment having a magnitude in excess of a predetermined value, wherein the number of detector circuits signaling the presence of an electrical characteristic having said predetermined magnitude is a measure of the value of the force being measured.

8. The force measuring apparatus of claim 6 wherein said axially spaced means are different sections of a helical winding of piezo-resistive material surrounding the outside of the tube, the resistance between the ends of each of said winding sections being related to the average stress applied to the segment by the pressure wave generated within the capillary tube, and each of said detector circuits being a resistance responsive circuit connected between the ends of one of said winding sections and operative to signal a condition where the resistance of the section reaches a predetermined value.

9. Force measuring apparatus comprising: a capillary tube made of piezoelectric material which generates electrical voltages along axially spaced segments thereof which are a direct function of the stresses applied thereto, spaced insulated conductive electrodes respectively applied to the outside of said capillary tube at said segments thereof, a common conductive electrode on the inside of said capillary tube, an individual detector circuit coupled between each of said spaced electrodes and said common electrode and responsive to the voltage generated thereacross, force receiving means for applying a pressure wave whose magnitude is proportional to the force to be measured to one end of said capillary tube wherein a pressure wave proceeds down toward the other end of the tube, surface tension and frictional drag providing a progressively decreasing pressure down the tube, individual detector circuits responsive to said electrical outputs respectively connected to said axially spaced means, each of said detector circuits including means for signaling the presence of an electrical output at the associated segment having a magnitude in excess of a predetermined value wherein the number of detector circuits signaling the presence of an electrical characteristic having said predetermined magnitude is a measure of the value of the force being measured.

References Cited by the Examiner

UNITED STATES PATENTS

| | | | |
|---|---|---|---|
| 2,053,436 | 9/1936 | Knowles | 73—71.2 X |
| 2,525,020 | 10/1950 | Jarlais | 73—35 |
| 2,966,673 | 12/1960 | Guernsey | 73—88.5 X |
| 3,087,148 | 4/1963 | Ludewig | 73—88 X |

RICHARD C. QUEISSER, *Primary Examiner.*